Patented Jan. 25, 1949

2,460,227

UNITED STATES PATENT OFFICE 2,460,227

EXTRACTION OF ELEMENTAL SULFUR FROM OILS

James Andrew Hart, Louis Nicholas Hollis and John Wilson Randolph, Hammond, Ind., assignors to Socony-Vacuum Oil Company, Incorporated, New York, N. Y., a corporation of New York No Drawing. Application April 11, 1945, Serial No. 587,840

2 Claims. (Cl. 196—30)

The present invention relates to the removal of elemental sulfur from water immiscible oils and, more particularly, to the removal of elemental sulfur from petroleum hydrocarbons.

It is well known to those skilled in the art that many hydrocarbon oils, and particularly petroleum oils, are contaminated by elemental sulfur. The elemental sulfur either is present in the crude oil or is produced in the refining operations. Due to the corosive effect of elemental sulfur, it has long been recognized by the industry that it is highly desirable to reduce the amount of elemental sulfur present in petroleum oils or in fractions thereof to the lowest possible minimum. Several processes involving various extracting solutions have been proposed for this purpose. Among these processes may be mentioned as illustrative those purposed and patented to Cobb and Schulze et al.

Cobb, for example, in United States Patents Numbered 1,300,816 and 1,413,005 proposes to remove elemental sulfur from hydrocarbon oils by contacting the hydrocarbon oil containing elemental sulfur with aqueous solutions of alkali metal sulfides or alkaline earth metal sulfides. Schulze et al. in United States Patent No. 2,020,661 describe a method for removing elemental sulfur from petroleum fractions which comprises contacting the petroleum fraction containing elemental sulfur with an aqueous solution of a polysulfide lower than the tetrasulfide selected from the group consisting of alkali and alkaline earth polysulfides. These patentees emphasize that monosulfides such as sodium monosulfide ($Na_2S$) are ineffectual for removing elemental sulfur from hydrocarbon oils containing the same.

Those skilled in the art will recognize that the proposals to which reference has been made hereinbefore involves the preparation of solutions of particular characteristics which are not commonly available in the petroleum refinery. On the other hand, it has now been discovered that better than 90 per cent of the elemental sulfur present in a water immiscible liquid such as a petroleum fraction, for example, gasoline, can be removed by contacting the water immiscible liquid with an aqueous solution of alkali metal hydroxide containing aromatic mercaptans. Such an extracting solution is made readily available in most petroleum refineries by combining the acid oils recovered from spent treating solution with an aqueous solution of an alkali metal hydroxide. It is to be noted that those skilled in the art know that the acid oils recovered from spent treating solution comprises a mixture of phenol, cresole, thiophenol, thiocresols, other aromatic mercaptans and other compounds. However, it can be clearly demonstrated that the extraction of elemental sulfur from water immiscible liquids such as petroleum oils is facilitated by the presence of aromatic mercaptans such as thiophenol, thiocresols, thioxlenols and the like in the aqueous solution of the alkali metal hydroxide.

It is an object of the present invention to provide a process for removing elemental sulfur from water immiscible liquids.

It is another object of the present invention to provide a means for removing elemental sulfur from hydrocarbon oils by contacting said hydrocarbon oils by contacting said hydrocarbon oils with an aqueous solution of alkali metal hydroxide containing aromatic mercaptans.

It is a further object of the present invention to provide a method for removing elemental sulfur from petroleum oil, fractions and distillates thereof by contacting the oil containing elemental sulfur with an aqueous solution of alkali metal hydroxide containing aromatic mercaptans.

The present invention also has as an object the provision of a method for removing at least 90 per cent of the elemental sulfur from hydrocarbon oils by contacting the hydrocarbon oil containing the elemental sulfur with an aqueous solution containing alkali metal hydroxide and aromatic mercaptans. Other objects and advantages of the present invention will become apparent from the following description thereof.

In general, the process of the present invention comprises contacting a water immiscible liquid containing elemental sulfur with an aqueous solution of alkali metal hydroxide containing aromatic mercaptans. Contact between the extracting solution and the water immiscible liquid or hydrocarbon oil can be accomplished in any suitable manner, as for example by introducing the hydrocarbon liquid containing the elemental sulfur into a tower containing the extracting solution at a point adjacent to the base of the tower. Due to the difference in density of the aqueous solution and the water immiscible liquid, for example, gasoline, the gasoline will rise through the column of aqueous solution and may be drawn off from the tower at a point above the upper level of the aqueous solution. By means well known to those skilled in the art, this can be made a continuous operation introducing extracting solution at an intermediate point in the tower and withdrawing the aqueous solution containing the elemental sulfur from the base of the tower while introducing contaminated hydrocarbon oil into the tower at a point above the drawoff for the aqueous extracting solution and withdrawing purified hydrocarbon oil from the tower at a point above that at which the extracting solution is introduced into the tower. Normally, the treating solution is recirculated continuously but may be revivified or fortified if necessary.

The hydrocarbon oil freed of substantially all of the elemental sulfur can be sent to storage or further treated as market requirements make necessary.

It has been found that satisfactory extraction of elemental sulfur from water immiscible liquids such as hydrocarbon oils and, for example, gasoline, can be obtained employing aqueous solutions containing about 1.0 per cent to about 35 per cent of alkali metal hydroxide, for example, sodium or potassium hydroxide, and also containing about 0.1 per cent to about 40 per cent of aromatic mercaptans, for example, thiophenol, thiocresols, thioxylenols and the like. It is preferred to carry out the extraction operation in the absence of oxidizing gases such as air. However, it has been found that the presence of reducing compounds such as sodium monosulfide, sodium thiosulfate and the like in amounts up to about 30 per cent limits the oxidation and the consequent loss of the aromatic mercaptan treating reagent by conversion to oil-soluble disulfides. It has also been found that contact times of from 10 to 20 minutes usually are sufficient to extract 90 per cent or more of the elemental sulfur present in the hydrocarbon oil.

While it has been found that aqueous solutions having a composition within the range of about 1.0 per cent to about 35 per cent alkali metal hydroxide, up to about 30 per cent of a reducing agent such as sodium sulfide and about 0.1 per cent to about 40 per cent aromatic mercaptan provide satisfactory results, it is preferred to use aqueous solutions containing about 15 per cent to about 25 per cent of alkali metal hydroxide, about 5 per cent to about 10 per cent of a reducing agent such as sodium sulfide, and about 0.5 per cent to about 10 per cent of aromatic mercaptans such as thiophenol, thiocresols, thioxylenols and the like. It is to be noted that the alkylated aromatic mercaptans appear to be somewhat more effective than the non-alkylated mercaptans, that is to say, as will be shown hereinafter, thiocresols, for example, appear to be more effective than thiophenol.

As those skilled in the art know, caustic solutions which have been in contact with hydrocarbon oils, for example, in removing acidic organic compounds from petroleum oil or fractions thereof, contain the aromatic mercaptans such as thiophenol, thiocresols and the like. When such caustic solutions have been used until the limit of solubility of such acidic organic substances in the caustic solutions has been reached, the caustic solutions are then known in the industry as "spent" caustic solutions. It is well known that these caustic solutions can be treated to recover the aromatic mercaptans either in a substantially pure form or in conjunction with other acidic compounds such as organic acids and phenol. Accordingly, it is the purpose of the present invention for economic reasons to use the acid oil recovered from such "spent" caustic solutions as a source of the aromatic mercaptans for use in the present process. However, those skilled in the art will understand that the aromatic mercaptan content of an aqueous solution of alkali metal hydroxide can comprise, wholly or in part, the substantially pure or the technical grade aromatic mercaptans readily available as such.

The ratio of the volume of the aqueous extracting solution to the volume of hydrocarbon oil being treated does not appear to be critical and it has been found that ratios of 1:1 to 1:4 provide satisfactory results when removing elemental sulfur from hydrocarbon oils such as gasoline.

The following table illustrates the results which can be obtained when treating a hydrocarbon oil to remove elemental sulfur. The results tabulated hereinafter were obtained by preparing a test mixture of sweet non-corrosive test gasoline containing elemental sulfur. The corrosive test gasoline was prepared by adding a weighted quantity of elemental sulfur to sweet non-corrosive gasoline. The contaminated corrosive test gasoline was mixed with the sweet non-corrosive gasoline in the proportion of 1 volume of corrosive gasoline to 3 volumes of sweet non-corrosive gasoline. Four volumes of the resulting mixture were then contacted with 1 volume of prepared aqueous treating solution having a known composition. The test gasoline and the treating solution were shaken under an atmosphere of nitrogen for 20 minutes in a shaking machine. The contents of the container were then allowed to settle for 20 minutes. A portion of the gasoline was decanted, filtered, and a copper strip corrosion test was run at 212° F. If the strip indicated that the gasoline was still corrosive the contents of the bottle were shaken for another 20 minutes. This procedure was repeated until a non-corrosive gasoline was obtained. When a negative corrosion was obtained in the foregoing test, the gasoline was then tested in a copper dish at 212° F. and the shaking repeated if necessary to obtain a negative copper dish test. The results of a series of such tests are tabulated in Table I.

TABLE I

*Results of treating gasoline containing 0.005% free or elemental sulfur with various aqueous solutions. (Solution: gasoline ratio=1:4)*

| Grams of Reagent per 100 cubic centimeters of Water | | | | | | | | Time, minutes | Copper Dish corrosion test |
|---|---|---|---|---|---|---|---|---|---|
| Thiocresol | Thiophenol | Cresol | Phenol | NaOH | KOH | Sodium Thiosulfate | Sodium Sulfide | | |
| 0 | | | | 32 | | | 5 | 480 | Positive. |
| 0 | | | | 32 | | | 10 | 480 | Do. |
| 2 | | | | 32 | | | 5 | 30 | Negative. |
| 0 | | | 20 | 5 | | | 5 | 80 | Positive. |
| 0 | | | | 25 | | | | 80 | Do. |
| 0 | | 21 | | 25 | | | | 80 | Do. |
| 0 | | 21 | | 25 | | | 15 | 80 | Do. |
| | 2 | | | | 35 | | | 20 | Negative. |
| 0.1 | | | | 25 | | | | 20 | Do. |
| 0.1 | | | | 15 | | | | 40 | Do. |
| 0.5 | | | | 25 | | | | 20 | Do. |
| 0.5 | | | | 25 | | | | 10 | Do. |
| 0.5 | | | | 15 | | | | 20 | Do. |
| 0.5 | | | | 15 | | | | 10 | Do. |
| 2 | | | | | 35 | | | 20 | Do. |
| | 3 | | | 32 | | | | 20 | Do. |
| 6 | | | | 32 | | | | 20 | Do. |
| 6 | | 10 | | 25 | | | | 20 | Do. |
| 10 | | | | 25 | | | | 20 | Do. |
| 10 | | | | 25 | | | 10 | 20 | Do. |
| 10 | | 20 | | 25 | | | 10 | 20 | Do. |
| 0.5 | | | | 15 | | | 5 | 20 | Do. |
| 0.5 | | | | 15 | | 5 | | 20 | Do. |
| 2 | | | | 15 | | | 5 | 20 | Do. |
| | 3 | | | 5 | | | 5 | 20 | Do. |
| 0.1 | | | | 1 | | | 0.2 | 20 | Do. |

The foregoing tabulation clearly establishes that the novel results produced by the present process are primarily due to the presence of aromatic mercaptans in the extraction solution.

The following tabulation illustrates the amount of elemental sulfur which can be extracted from a hydrocarbon oil such as gasoline containing a known amount of elemental sulfur. Sweet non-corrosive gasoline containing a known amount of total sulfur was used as the basic oil. To this sweet non-corrosive gasoline was added elemental sulfur to provide a gasoline containing the amount of free or elemental sulfur indicated in the table. Each sample of corrosive gasoline was then shaken with an aqueous solution having the composition indicated and in the ratio and for the period of time set forth in Table II. Thereafter the amount of free sulfur removed from the gasoline in the aqueous phase was determined by subtracting the per cent disulfide sulfur, which is the amount of sulfur present in the original non-corrosive gasoline from the total sulfur content of the treated gasoline and then subtracting this value from the amount of elemental sulfur added to the sweet gasoline. The value so obtained is the amount of free sulfur removed by the treating solution. From this value and the value of the amount of free sulfur added to the sweet gasoline, the percentage of elemental sulfur removed in the aqueous phase is obtained. The remainder of the free sulfur is converted to gasoline-soluble non-corrosive sulfur compounds.

TABLE II

| Treating Conditions | | Grams Reagt. per 100 cc. H₂O | | | | Percent Total Sulfur In Gasoline, A | Per cent Free Sulfur Add., B | Per cent Total Sulfur Before Treat, A+B=C | Per cent Total Sulfur after Treat, D | Increase in Disulfide Sulfur after Treat, D−A=E | Free Sulfur Removed in Aqueous Phase, B−E=F | Per Cent Free Sulfur Removed In Aqueous Phase (F÷B) (100) =G | Per Cent Free Sulfur Converted to Non-Corrosive Sulfur Compounds (E÷B) (100) |
|---|---|---|---|---|---|---|---|---|---|---|---|---|---|
| Solution Gasoline Ratio | Time, Minutes | Thiocresol | NaOH | Na₂S | Na₂S₂O₃ | | | | | | | | |
| 1:4 | 120 | 2.0 | 15.0 | 0 | 0 | 0.011 | 0.271 | 0.282 | 0.026 | 0.015 | 0.256 | 94.5 | 5.5 |
| 1:4 | 120 | 2.0 | 15.0 | 5.0 | 0 | 0.011 | 0.271 | 0.282 | 0.019 | 0.008 | 0.263 | 97.0 | 3.0 |
| 1:4 | 120 | 2.0 | 15.0 | 0 | 5.0 | 0.011 | 0.271 | 0.282 | 0.031 | 0.020 | 0.251 | 92.6 | 7.4 |
| 1:1 | 60 | 2.0 | 15.0 | 0 | 0 | 0.016 | 0.090 | 0.106 | 0.018 | 0.002 | 0.088 | 97.8 | 2.2 |
| 1:1 | 60 | 2.0 | 15.0 | 0 | 0.5 | 0.016 | 0.090 | 0.106 | 0.016 | 0.000 | 0.090 | 100.0 | 0.0 |

The data provided hereinbefore in Table II clearly establishes that 90 per cent or more of the elemental sulfur present in a water immiscible liquid such as a hydrocarbon oil, for example, a petroleum fraction, can be removed by contacting the hydrocarbon oil containing the elemental sulfur with an aqueous solution of an alkali metal hydroxide and aromatic mercaptans for a period of time. It does not appear that the ratio of treating solution to gasoline is critical and that ratios of 1:1 and higher may be employed. The data set forth in Table II also indicates that in the presence of a reducing agent such as sodium sulfide or sodium thiosulfate the conversion of elemental sulfur to disulfide is reduced.

Although the present invention has been described and disclosed in conjunction with certain illustrative examples thereof, it is to be understood that the scope of this disclosure is not limited thereby and is limited only by the appended claims.

We claim:

1. A method for removing elemental sulfur from gasoline which comprises contacting gasoline containing elemental sulfur with an aqueous solution containing about 15 per cent to about 25 per cent by weight of sodium hydroxide, about 5 per cent to about 10 per cent by weight sodium sulfide, and about 0.5 per cent to about 10 per cent thiocresols, thereby dissolving said elemental sulfur in said aqueous solution, and separating said aqueous solution from the gasoline.

2. A method for removing elemental sulfur from gasoline which comprises contacting gasoline containing elemental sulfur with an aqueous solution containing about 1 per cent to about 35 per cent alkali metal hydroxide, about 5 per cent to about 10 per cent sodium sulfide, and about 0.5 per cent to about 10 per cent aromatic mercaptans, thereby dissolving said elemental sulfur in said aqueous solution, and separating said aqueous solution from the gasoline.

JAMES ANDREW HART.
LOUIS NICHOLAS HOLLIS.
JOHN WILSON RANDOLPH.

REFERENCES CITED

The following references are of record in the file of this patent:

UNITED STATES PATENTS

| Number | Name | Date |
| --- | --- | --- |
| 1,970,583 | Stagner | Aug. 21, 1934 |
| 2,020,661 | Schulze | Nov. 12, 1935 |
| 2,292,636 | Henderson et al. (A) | Aug. 11, 1942 |
| 2,317,054 | Henderson et al. (B) | Apr. 20, 1943 |
| 2,335,347 | McNamara | Nov. 30, 1943 |

FOREIGN PATENTS

| Number | Country | Date |
| --- | --- | --- |
| 126,544 | Hungary | Mar. 17, 1941 |

OTHER REFERENCES

Gruse et al., "Chemical Technology of Petroleum." Second edition McGraw-Hill Book Co., (1942) New York city—page 316.

Certificate of Correction

Patent No. 2,460,227. January 25, 1949.

JAMES ANDREW HART ET AL.

It is hereby certified that errors appear in the printed specification of the above numbered patent requiring correction as follows:

Column 1, line 18, for "purposed" read *proposed*; column 2, line 24, for "thioxlenols" read *thioxylenols*; lines 32 and 33, strike out the words "by contacting said hydrocarbon oils";

and that the said Letters Patent should be read with these corrections therein that the same may conform to the record of the case in the Patent Office.

Signed and sealed this 2nd day of August, A. D. 1949.

[SEAL]

THOMAS F. MURPHY,
*Assistant Commissioner of Patents.*